United States Patent Office 3,324,893
Patented June 13, 1967

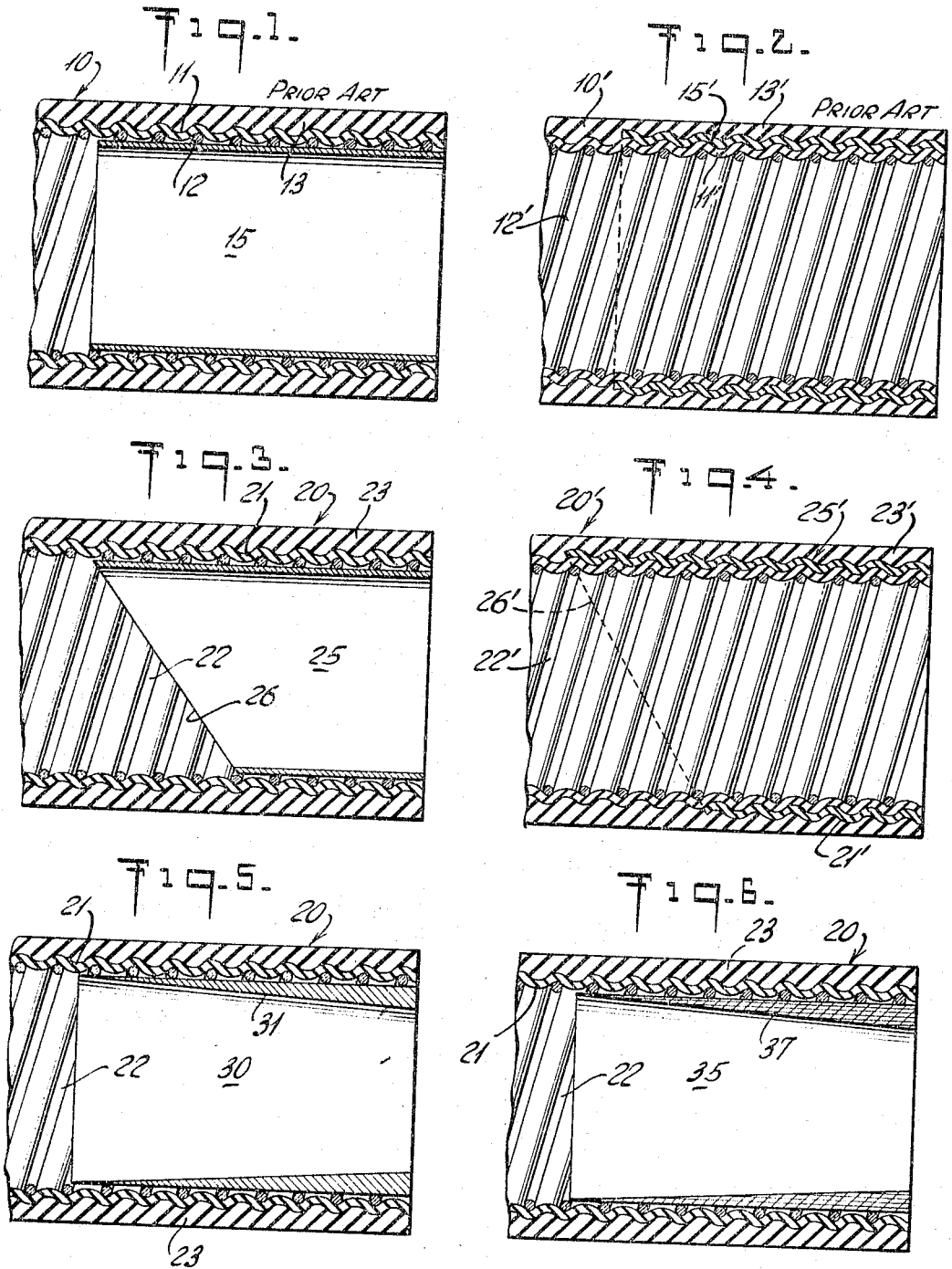

3,324,893
COUPLING END REINFORCEMENT FOR
FLEXIBLE CONDUIT
Malvin H. Goldenberg, 27 Phipps Lane,
Plainview, N.Y. 11803
Filed Mar. 3, 1964, Ser. No. 349,000
3 Claims. (Cl. 138—109)

This invention relates to flexible conduits such as used for fluid-tight transfer of fluids including gases and liquids, and arranged to have one or both ends coupled with a relatively rigid tubular component with respect to which the conduit is adapted to be flexed. More particularly, the present invention is directed to an improved reinforcing means strengthening the end portion of the conduit coupled to such a component against weakening and breaking of the relatively flexible tubular wall of the conduit.

Flexible conduits are used extensively for fluid transfer with both liquids and gases. Among other applications where flexible conduits have found wide use are as the hoses of vacuum cleaners, and as the connections of oxygen devices and respiration devices, air compressor systems, cooling systems, and other like uses.

To provide flexibility as well as fluid-tight impermeability for the fluid being transmitted, the relatively elongated tubular walls of such conduits have been made of relatively flexible fluid-tight material such as, for example, plastic composition materials, rubber, or rubber-like materials. Various arrangements have been used for radially reinforcing such conduits to prevent restriction of the conduit when it is bent, or to prevent radial collapse thereof during flexing or bending of the conduit. For example, some conduits are provided with interior or exterior reinforcements of metallic wire or plastic of various cross sections. The metallic wire may be bare or it may be coated with other metals, or with rubber, plastic, plastic composition material, or rubber-like material. These considerations apply where a separate reinforcing member is used for the tubular wall of the conduit.

Other reinforcing arrangements have also been used. For example, the flexible tubular wall has been formed by helically or spirally winding rubber, plastic composition material, or rubber-like material of such cross section that the completed conduit will maintain its tubular body. Further arrangements include the use of corrugations formed in the body of the conduit for the purpose of maintaining the tubular form against radial collapse during flexing of the conduit.

As stated, one or both ends, and usually both ends, of such flexible conduits are arranged to be coupled to a relatively rigid component such as, in the case of a vacuum cleaner, the blower outlet or inlet at one end of the flexible conduit and a suction or blowing nozzle at the other end of the flexible conduit. Due to the fact that this combination represents a relatively flexible member, such as the flexible conduit, coupled to a relatively rigid component, a problem of weakening and breaking of the wall of the flexible conduit is introduced due to the fact that the greatest stresses occur at or immediately adjacent the connection of the relatively flexible conduit to the relatively rigid component. For this reason, various arrangements have been proposed for modifying the construction of flexible conduits adjacent or at the ends thereof. Such reinforcing arrangements have taken various forms, including closer spacing of reinforcing members, closer spacing of corrugations, the use of a heavier or thicker reinforcing or conduit wall at the ends, or the addition of a separate end reinforcing member. While the reinforcing or strengthening arrangements used hitherto have reduced breakage and weakening to some extent, it has been recognized that a substantial improvement in reinforcing or strengthening of the ends of flexible conduits is needed.

Specifically, with present end reinforcing arrangements, the greatest stress is concentrated over a relatively narrow annular area of the flexible conduit or of the reinforcement. Thus, if the end reinforcement is relatively flexible, the greatest strain occurs at the zone where the flexible conduit is joined to another less flexible component of the system. On the other hand, if the end reinforcement is less flexible or more rigid, the greatest strain is at the inner end of the reinforcement. In other cases, all of the strain occurs or is concentrated in one relatively narrow annular area of the flexible conduit or of the reinforcement.

In accordance with the present invention, an improved end reinforcing means for a flexible conduit is provided in which the stresses occurring between two members of different flexibility, such as the relatively flexible wall of the conduit and a relatively less flexible reinforcement telescoped therewith, is distributed over a substantial axial length of the flexible conduit and of the reinforcement. Thus, the stress concentration is gradually diminished in a direction away from the zone of engagement between a more flexible element and a less flexible element. This provides greatly improved protection against breakage or weakening of the flexible wall of the conduit at or near the ends or points of attachment thereof to relatively rigid or relatively less flexible components of the system with which the flexible conduit is used.

Thus, and with the present invention, the stress occurring at the conjunction of two members of different flexibility is distributed over a much wider annular area of the conduit, as over several convolutions of the conduit wall in the event that the latter is spirally or helically wound, or over several convolutions of a conduit reinforcement where a spiral or helical reinforcement is used with the flexible conduit.

For an understanding of the principles of the invention, reference is made to the following description of typical embodiments thereof as illustrated in the accompanying drawings. In the drawings:

FIGS. 1 and 2 are axial sectional views through flexible conduits representative of presently used prior art constructions for reinforcing the coupling ends of flexible conduits; and FIGS. 3 through 7 are similar views illustrating flexible conduits embodying the invention.

Referring first to the prior art construction shown in FIGS. 1 and 2, FIG. 1 illustrates a flexible conduit 10 embodying a relatively elongated tubular wall 11 of relatively flexible fluid-tight material. The wall 11 is provided with reinforcing means for preventing radio collapse thereof during flexing or bending of the conduit 10. The particular reinforcing means shown in FIG. 1 comprises a spiral reinforcement of wire or plastic indicated at 12. An outer covering 13 is provided over the flexible wall 11, although this may be omitted if desired.

In accordance with known prior art practice, the end of conduit 10 which is to be coupled to a relatively rigid component, such as a nozzle or the like, is additionally reinforced inwardly from such end, and this additional reinforcement is, in the case of prior art arrangements, a tubular member 15. Tubular member 15 may be more flexible than flexible wall 11 and, in such case, the stress will be concentrated at the very narrow annular zone where the flexible conduit 10 is in engagement with the end of the relatively rigid nozzle or the like. On the other hand, and if reinforcement 15 is more rigid or less flexible than wall 11, the greatest concentration of stress on the flexible wall 11 will occur at the inner end of reinforcement 15 and again in a very narrow annular zone. As stated, while reinforcement 15 provides some protection against weakening and breakage of the wall of flexible conduit 10, the reinforcement against weakening or breakage is not sufficient and it is desirable that an improved reinforcing means be provided.

FIG. 2 illustrates a variation of this prior art arrangement, and the same reference characters, primed, have been used to designate parts corresponding or identical with those of FIG. 1. The difference of the arrangement in FIG. 2 is that the end reinforcing sleeve or tubular wall means 15' is disposed between the flexible wall 11 and its outer covering 13, rather than interiorly of the spiral reinforcement 12. This prior art arrangement has exactly the same defects from the standpoint of effectively inhibiting weakening and breakage of the wall of the flexible tubing as does the arrangement of FIG. 1.

FIG. 3 illustrates a conduit of the type shown in FIG. 1 but provided with an end reinforcement in accordance with the present invention. Thus, the flexible conduit 20 of FIG. 3 includes a relatively elongated flexible tubular wall 21 which is reinforced against radial collapse by a spiral reinforcement 22 and which has an outer covering 23. It should be understood, in the following discussion of FIGS. 3, 4, 5 and 6, that, while a spiral type of reinforcement has been illustrated, this is solely by way of example in that the invention is fully applicable to flexible conduits having other means providing reinforcement against radial collapse or flattening of the flexible conduit during bending thereof.

In accordance with the present invention, that end of conduit 20 which is arranged to be coupled to a relatively rigid component, or both ends of the conduit 20, has inserted therein a relatively elongated tubular reinforcing means so that the latter is telescoped with the flexible tubular wall 21 and extends inwardly from the end of the conduit. In accordance with the invention, the inner portion of the tubular end reinforcing means 25 decreases, in effective wall dimensions measured diametrically of conduit 20, from a diametric plane outwardly of the inner end of the tubular reinforcing means 25 to a minimum at the inner end of the latter. In the arrangement of FIG. 3, this is effected by providing the inner end of tubular reinforcing means 25 with a bias cut edge 26. Due to the bias cut of inner end 26, the bending stresses which could occur at the junction between two parts, 21 and 25, of different flexibility, are distributed over an axially elongated annular area of the tubular wall 21 and over several convolutions of the spiral reinforcement 22.

FIG. 4 illustrates an arrangement which is essentially similar, insofar as the conduit construction is concerned, to that of FIG. 2, but which includes an end reinforcing member 25' which is identical with the end reinforcing member 25 of FIG. 3. In this case, as in FIG. 2, the end reinforcing member 25' is disposed between the flexible tubular wall 21' and its outer covering 23' rather than being disposed interiorly of the reinforcing 22' as in FIG. 3. The results, insofar as the distribution of stresses over a relatively axially elongated annular area of the flexible conduit 20', and particularly of the flexible tubular wall 21', are the same as in the arrangement of FIG. 3.

FIGS. 5 and 6 illustrate an alternative arrangement of the end reinforcing member whereby the mentioned effect of decreasing the effective wall dimensions, measured diametrically of the conduit, of the end reinforcing member, and from the diametric plane outwardly of the inner end thereof to a minimum at the inner end thereof can be attained. Thus, and referring particularly to FIG. 5, the end reinforcing member 30 decreases in thickness inwardly from its outer end to its inner end so that, in effect, the cross section of the wall of member 30 is tapered in thickness as indicated at 31. Thus, the cross sectional area of the wall and thus the effective wall dimensions measured diametrically of the conduit 20, decrease in an inward direction. In this particular instance, the stress concentration occurring between two members, such as 21 and 30 of different flexibility, is distributed over the full axial length of the reinforcing member 30. The reinforcing member 30 could, for example, be molded before insertion into the conduit 20.

FIG. 6 illustrates an arrangement, equivalent to that of FIG. 5, in which a reinforcing member 35 is constructed by wrapping a triangular section of thin material on a mandrel so as to provide a tapered insert. The reinforcing member 35 is provided with the several convolutions 36 which give a net tapered effect to the reinforcing member as indicated by the sloping inner edge 37. Again, as in FIGS. 3, 4 and 5, the wall dimensions of the tubular reinforcing means 35 decrease, as measured diametrically of conduit 20, from the outer end of the reinforcing means 35 to the inner end thereof.

It will be apparent that modification of the end reinforcements 25, 25', 30 and 35 could be made, such as the provision of ribs, flutes, annular convolutions and helical convolutions. Furthermore, the tubular reinforcing means could be incorporated as an integral part of the material of conduit 20 or 20' by varying the thickness or flexibility at the points where reinforcement is desired. Strips of reinforcing material may be used, rather than a single piece, in order to attain the objectives of the invention.

While specific embodiments of the invention have been shown and described in detail to illustrate the application of the principles of the invention, it will be understood that the invention may be embodied otherwise without departing from such principles.

What is claimed is:

1. In a flexible conduit including a relatively elongated tubular wall of relatively flexible fluid-tight material reinforced against radial collapse during bending of the conduit by means of a spiral winding secured to said tubular wall along its length, and arranged to have at least one end coupled with a relatively rigid tubular component with respect to which the conduit is adapted to be flexed: improved reinforcing means strengthening the end portion of the conduit coupled to said component against weakening and breaking of said relatively flexible tubular wall, said reinforcing means comprising relatively elongated tubular reinforcing means telescoped with said tubular wall and extending inwardly from the end of said conduit; said tubular reinforcing means having an inner end lying in a plane which intersects a diametric plane thereof at an angle to extend over a plurality of turns of said spiral winding.

2. In a flexible conduit, improved end reinforcing means, as claimed in claim 1, in which said tubular reinforcing means is disposed within said relatively elongated tubular wall.

3. In a flexible conduit, improved end reinforcing means, as claimed in claim 1, in which said tubular end reinforcing means is telescoped over said relatively elongated tubular wall.

References Cited

UNITED STATES PATENTS 1,205,987 11/1916 Girten et al. _____ 138—109
2,251,718 8/1941 Parker _____ 285—115

LAVERNE D. GEIGER, *Primary Examiner.*

T. L. MOORHEAD, *Assistant Examiner.*